Feb. 8, 1949.  G. E. NIGHTHART  2,460,944
BICYCLE HOLDING FIXTURE
Filed June 28, 1946  2 Sheets-Sheet 1

INVENTOR
George E. Nighthart
BY
Robert T. Teeter
ATTORNEY

Feb. 8, 1949. G. E. NIGHTHART 2,460,944
BICYCLE HOLDING FIXTURE
Filed June 28, 1946 2 Sheets-Sheet 2

INVENTOR
George E. Nighthart
BY
Robert T. Teeter
ATTORNEY

Patented Feb. 8, 1949

2,460,944

UNITED STATES PATENT OFFICE 2,460,944

BICYCLE HOLDING FIXTURE

George Edward Nighthart, Lewistown, Pa.

Application June 28, 1946, Serial No. 680,277

1 Claim. (Cl. 81—32)

This invention relates to a novel bicycle holding fixture and accessories therefor. The invention has been developed to provide improved facilities for repairing bicycles. More specifically, the invention is adapted to the purpose of holding a bicycle and various parts thereof firmly in convenient positions for repair work to be done thereon.

Without a bicycle holding fixture, repair work on bicycles must be done with the bicycle upside down on the floor. In this position the handle bars and saddle rest on the floor, and the parts being worked upon must be held by the repairman. In this situation the positions in which the repairman must work are awkward.

If a bicycle is placed on a work bench, it is virtually impossible to hold it with sufficient firmness to do any but the most minor kind of repair work without resort to some kind of improvised clamp. The use of an ordinary type of work bench vise for this purpose is impractical, because of numerous limitations.

My invention has for its purpose the fulfillment of the needs of the bicycle repairman. Among others the invention has for its objects the following, taken singly or in combination, the provision of a bicycle holding fixture adapted to clamp two members of the bicycle frame and permit its location in a rotational manner at any desired position around a horizontal axis; and the provision in such a fixture of means for rotatively locating the bicycle in any desired position around a vertical axis.

Other objects and advantages of the invention will appear upon a further reading of the detailed specification which immediately follows.

In the drawings, Fig. 1 is a plan view of a preferred embodiment of my new bicycle holding fixture suitable for mounting on a work bench;

Figure 4:
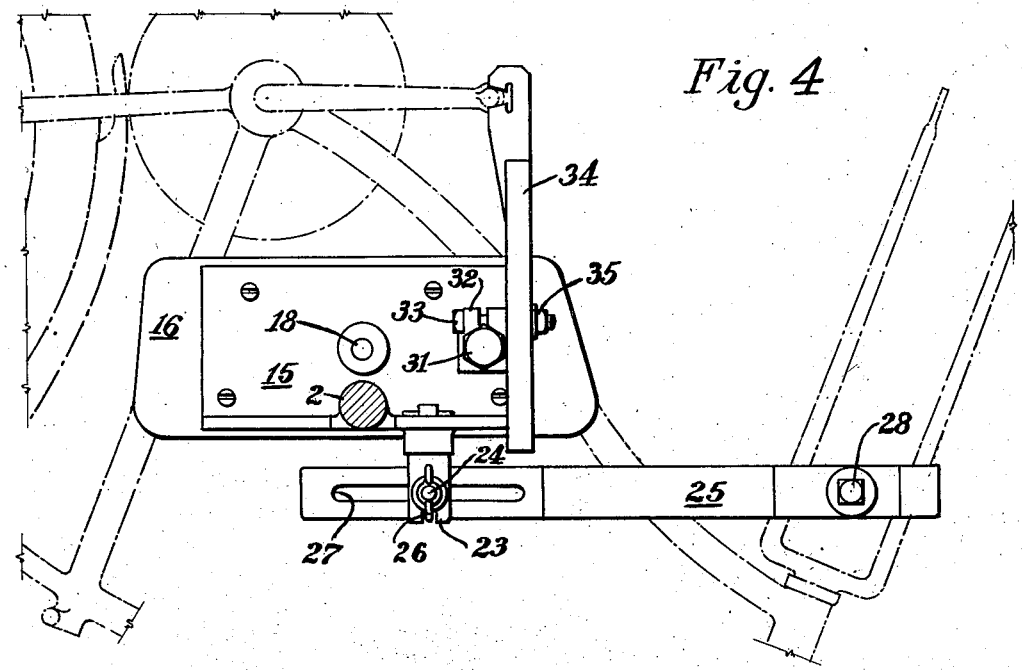
Figure 5:
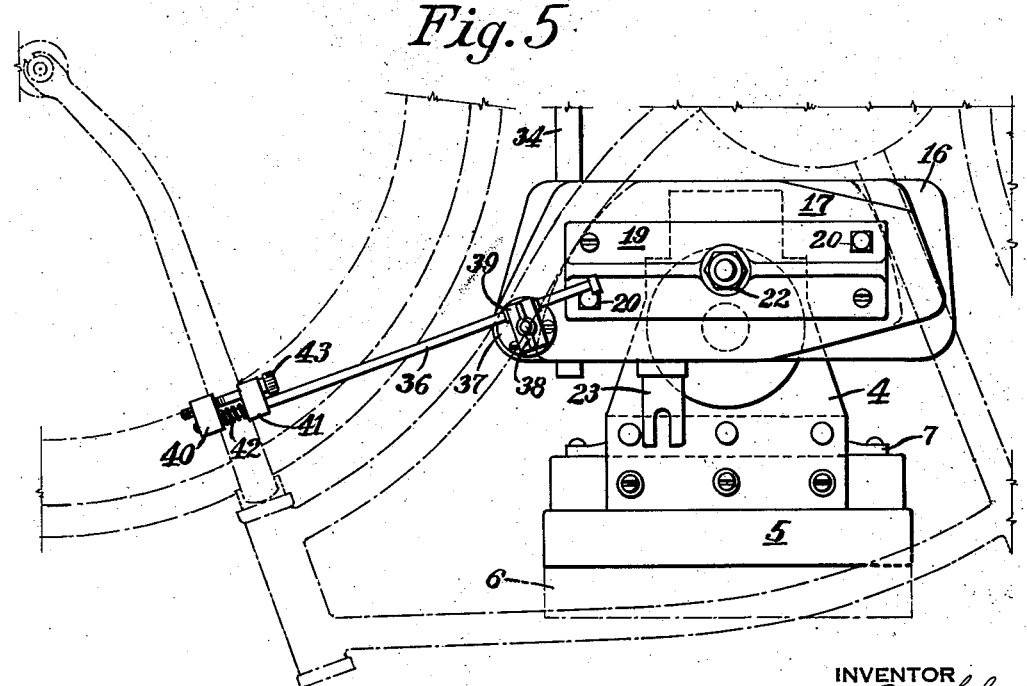

Fig. 4 is a rear elevation of the bicycle vise portion of the fixture showing my pedal arm clamp and my heavy duty steering fork clamp in typical working positions (portions of a bicycle clamped and held thereby appear in dot and dash lines); and Fig. 5 is a front elevation of the fixture showing my steering fork stabilizer in typical working position (portions of a bicycle clamped and held thereby appear in dot and dash lines).

Figure 1:
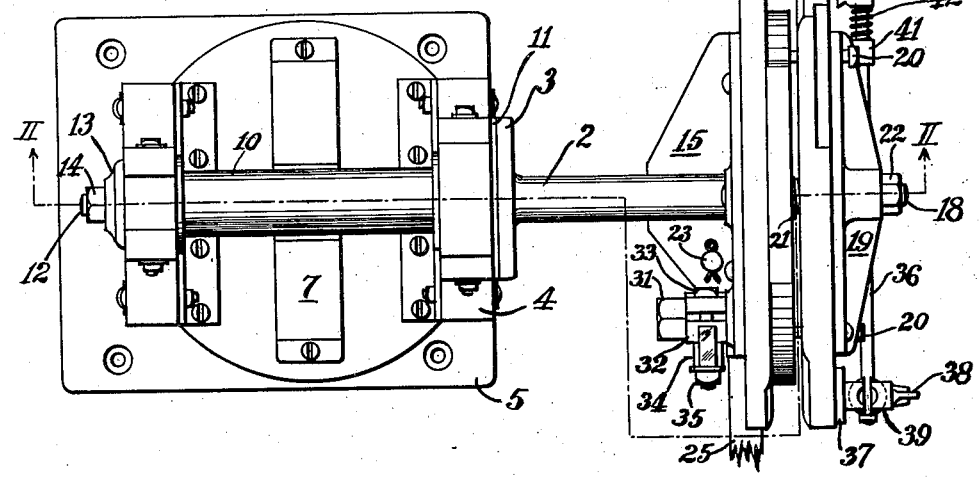
Figure 2:
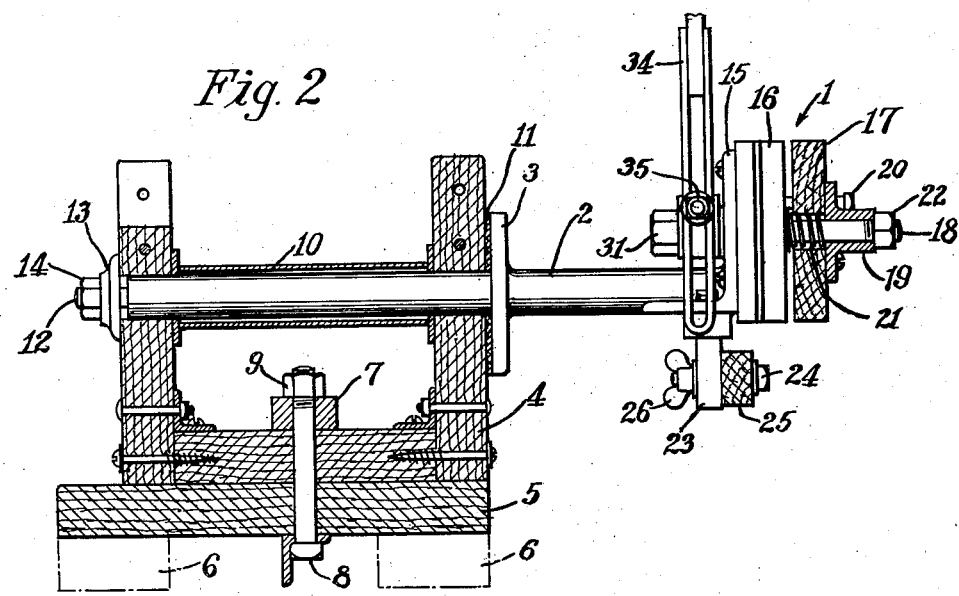
Fig. 2 is an elevation, partly in section, of the fixture shown in Fig. 1, the partial section being taken on the line II—II of Fig. 1.

Referring now to the drawings and particularly to Figs. 1 and 2 my new bicycle holding fixture will be described, as will the accessories therefor. The fixture consists of four main parts: the vise 1, the vise supporting shaft 2, a pressure disc 3, and the fixture stand 4. A base plate 5 for the fixture may be secured to a work bench by suitable screws or bolts. Blocks 6 shown in dotted lines are required to secure the proper fixture height.

The fixture stand 4 is shown to comprise two upright members and a horizontal base member all of wood, the uprights and base members are secured together preferably by angle irons and suitable screws and bolts. Through an approximately central hole in the base plate 5, a central hole in the base member of the fixture stand 4, and a corresponding hole in a reinforcing strap 7 on the base member of the fixture stand 4, there extends a vertically disposed bolt 8. The bolt 8 may first pass through a suitable angle iron under the base plate 5, and at the reinforcing strap 7 receives a nut 9. This arrangement permits my bicycle holding fixture to be rotated as a whole about the vertical axis defined by the bolt 8. The fixture may be located in the desired rotative position about this axis by drawing up on the single nut 9.

The fixture stand 4 supports the horizontally disposed vise supporting shaft 2 in simple bearings located in the two upright members thereof. Between the upright fixture members and around the supporting shaft 2 there is a spacer sleeve 10. Just outside the upright member nearest the vise 1 there is a friction disc 11, surrounding the supporting shaft 2. This friction disc 11 coacts with the pressure disc 3 which is made integral with the supporting shaft 2.

At the end of the supporting shaft 2 opposite from the vise 1 there is a stud 12 extending through the upright member opposite that just referred to. On the outside of this upright member and over the stud 12 there is a clamping collar 13 and a nut 14. It will be seen that the vise 1 may be rotated to any desired position about the horizontal axis defined by the supporting shaft 2 and locked in position by drawing up on the single nut 14. Such action brings into locking coaction the pressure disc 3 and friction disc 11.

The vise 1 comprises a jaw plate 15 suitably attached to the supporting shaft 2, a rear clamping jaw 16, a front clamping jaw 17, and a front jaw plate 19. The rear clamping jaw 16 is secured by suitable screws to the face of the jaw plate 15. The front clamping jaw 17 is mounted over a vise assembly bolt 18 and attached to the moveable front jaw plate 19 by suitable screws. The moveable front jaw plate 19 and front clamping jaw 17 are guided in their movement over the vise assembly bolt 18 by guide screws 20. The front clamping jaw 17 and moveable front jaw plate 19 are pressed away from the rear clamping jaw 16 and rear jaw plate 15 by the coil spring 21 located over the assembly bolt 18 between the fixed parts and the moveable parts. This assembly is held together by the nut 22 on the assembly bolt 18, the moveable front jaw plate 19 bearing against the face of the nut 22. It will be readily seen that clamping jaws 16 and 17 can be drawn up on the bicycle frame members so as to clamp the same by drawing up on the single nut 22. It may be noted that the clamping jaws 16 and 17 are made of hard wood which is desirable for its frictional and non-marking characteristics. The jaws are especially designed, as will appear upon reference to other views, to grip two of the bicycle frame members simultaneously by the manipulation of the one nut 22 on the assembly bolt 18.

Figure 3:
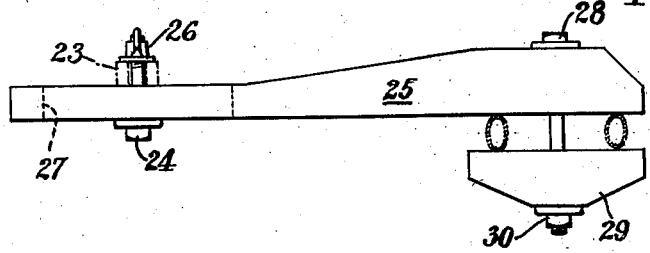
Fig. 3 is a bottom view of my heavy duty steering fork clamp.

The main features of the bicycle holding fixture having been described, attention will now be turned to the special accessories useful therewith. Figs. 3 and 4 illustrate my new heavy duty steering fork clamp. The purpose of this device is to hold steering forks firmly against rotation under heavy torque loads while removing highly resistant parts from the bicycle fork stem, as in cases of corroded or overexpanded parts or crossed threads. Extending downward from the jaw plate 15 is a swivel mounted member 23. This member 23 has an open slot at its lower end adapted to receive the clamping bolt 24 of my heavy duty steering fork clamp 25. The steering fork clamp 25 shown in Fig. 3 may be mounted on or demounted from the swivel mounted member 23 as desired, utilizing the wing nut 26 on the clamping bolt 24. The steering fork clamp 25 has an elongated slot 27 for adjusting the reach thereof from the swivel mounted member 23 to the steering fork of a bicycle. It will be noted that the steering fork clamp 25 may conveniently reach in a lateral direction from just below the vise 1 to a steering fork. At the steering fork end of the clamp 25 there is a through bolt 28, a clamping bar 29 and a nut 30 on the bolt 28.

With special reference to Figs. 1, 2 and 4 I will now describe my new pedal arm clamp. The purpose of the mechanism now to be described is to hold pedal arms and crank for removal or assembly of crank parts and pedals, particularly when difficulty is experienced with corroded parts or crossed threads. Tapped into the jaw plate 15 at one side of the center line thereof is a hole which receives a cap screw 31. Between the head of the cap screw 31 and the upright plate of the jaw plate 15 is a split collar 32 with a locking bolt therethrough at right angles to the cap screw 31. The locking bolt 33 passes through a slotted portion of the upright pedal arm clamp 34. The nut 35 on the locking bolt 33 clamps the pedal arm clamp 34 in proper upward position and likewise clamps the split collar 32 in proper rotative position about the cap screw 31. Thus it will be seen that a simple manipulation of the nut 35 permits the pedal arm clamp 34 to be extended or retracted, and to be rotated about the locking bolt 33, and likewise permits the pedal arm clamp 34 to be rotated to any desired degree about the cap screw 31. Engagement of the pedal arm clamp 34 with a bicycle pedal arm may be readily effected and the pedal arm may be held in all three positions by the tightening of the single nut 35.

Referring particularly to Figs. 1 and 5, I will now describe my new steering fork stabilizer 36. The stabilizer 36 is shown in Fig. 1 in its folded, out of the way position, whereas it is shown in Fig. 5 in its typical working position. The out of the way position is essential when placing the bicycle in or removing it from the fixture, and also it may be folded out of the way when my heavy duty steering fork clamp 25 is used. The stabilizer 36 is for lighter service, particularly before the front wheel is removed from the bicycle, but is needed not merely for holding the front wheel and handle bars in a straight line position to facilitate work on adjacent parts and permit rotation on the horizontal axis, but more especially for holding the fork while performing dismantling, repairing and assembly operations on front wheel, axle, fender, handle bars, and accessories such as truss rods, baskets, lights, bells, speedometers, etc.

A flanged bolt 37 is secured to one corner of the outside face of the front clamping jaw 17. Secured on this flanged bolt 37 by a suitable wing nut 38 is a split clamp 39. The split clamp 39 is rotatable about the flanged bolt 37 and may be secured in desired position by drawing up on the wing nut 38. Within the split clamp 39 are swivel jaws adapted to receive the steering fork stabilizer 36. By reason of this assembly the steering fork stabilizer 36 may be extended or retracted in the direction of the bicycle steering fork, rotated about the flanged bolt 37 to accommodate it to one side of a bicycle steering fork, and moved inwardly or outwardly to suit the width of fork being clamped, thus using one means for adjusting and holding of the clamp in three directions. At the end of the steering fork stabilizer 36 furthest removed from the flanged bolt 37 is an adjustable clamp comprised of a fixed jaw 40 attached to the steering fork stabilizer rod 36 and a moveable jaw 41 slideable on the rod 36. The jaws 40 and 41 are pressed apart by a spring 42 therebetween on the rod 36. The moveable jaw 41 may be drawn up into clamping position opposite the fixed jaw 40 by means of a clamping thumb screw 43 passing through the moveable jaw 41 and screwed into the fixed jaw 40.

From the foregoing description it will be seen that I have provided a bicycle holding fixture having the following features. The fixture comprises a swivel mounted fixture stand and a rotationally mounted clamping vise. Single screw means are provided for locking the swivel mounting and likewise single screw means are provided for locking the rotational mounting. Likewise the clamping jaws of the vise itself are provided with a single screw means for operation thereof.

The hardwood clamping jaws are shaped to accommodate and clamp the frame members of the bicycle near the pedal crank bearing and juncture of the frame members. It will be noted that the vise is thus adapted to firmly clamp the main frame members of the bicycle near its center of gravity. The rotational mounting of the vise permits rotating the clamped bicycle to any desired position. Likewise the swivel mounting of the fixture stand permits swiveling of the bicycle to any convenient position for doing work thereon.

The provision of a clamping vise which secures the bicycle at the frame members near the pedal arm crank adapts that vise to the use of my above described accessory clamping members. The steering fork stabilizer clamp may readily be extended from the vise to the steering fork. It may be used, for instance, to stabilize the steering fork while the front wheel is being removed. The heavy duty steering fork clamp may be used, for instance, after the wheel is removed from the steering fork. Likewise the vise is conveniently located so that the pedal arm clamp has a short reach to the end of one of the pedal arms. It may be used to secure the pedal arms against rotation when work is to be done on the pedal crank bearing, for instance.

From the foregoing description it will be seen that the stated objects and advantages of my invention are readily achieved. My invention has wide applicability to the various needs of the bicycle repairman, and has proven useful in actual repair shop service. It of course may take various forms and embodiments within the scope of the appended claim.

I claim:

A bicycle holding fixture comprising a clamping vise adapted to clamp frame members of a bicycle and hold the same for repair work and provided with a single clamping bolt and nut, a horizontal vise supporting shaft provided with a pressure disc and a single locking stud and nut, a fixture stand for said supporting shaft and provided with a friction disc in cooperative relation to said pressure disc and located between said pressure disc and said locking stud and nut, and a fixture base provided with a single vertical bolt and nut, said fixture stand being rotatable on said fixture base about said vertical bolt, said supporting shaft being rotatable in said fixture stand, and said vise being operated by said clamping bolt and nut.

GEORGE EDWARD NIGHTHART.

REFERENCES CITED

The following references are of record in the file of this patent:

UNITED STATES PATENTS

| Number | Name | Date |
|---|---|---|
| 632,381 | Theodore | Sept. 5, 1899 |
| 776,553 | Scoggins | Dec. 6, 1904 |
| 1,529,251 | Hansen | Mar. 10, 1925 |
| 1,611,305 | Ellwood | Dec. 21, 1926 |
| 2,188,433 | Friese | Jan. 30, 1940 |
| 2,261,055 | Dulaney | Oct. 28, 1941 |
| 2,312,914 | Koszeghy | Mar. 2, 1943 |